(12) United States Patent
He et al.

(10) Patent No.: US 7,526,658 B1
(45) Date of Patent: *Apr. 28, 2009

(54) SCALABLE, DISTRIBUTED METHOD AND APPARATUS FOR TRANSFORMING PACKETS TO ENABLE SECURE COMMUNICATION BETWEEN TWO STATIONS

(75) Inventors: Haixiang He, Woburn, MA (US); Donald Fedyk, Groton, MA (US); Lakshminath Dondeti, Chelmsford, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 795 days.

This patent is subject to a terminal disclaimer.

(21) Appl. No.: 10/661,903

(22) Filed: Sep. 12, 2003

Related U.S. Application Data

(60) Provisional application No. 60/442,657, filed on Jan. 24, 2003.

(51) Int. Cl.
*H04L 9/32* (2006.01)
*H04L 9/00* (2006.01)
*G06F 11/30* (2006.01)

(52) U.S. Cl. .............. 713/193; 713/190; 713/191; 713/192; 713/194; 726/27; 726/28; 726/29; 726/30; 726/23

(58) Field of Classification Search .............. 713/160
See application file for complete search history.

(56) References Cited

U.S. PATENT DOCUMENTS

| | | | |
|---|---|---|---|
| 6,185,680 B1 * | 2/2001 | Shimbo et al. ............. 713/160 |
| 6,330,562 B1 | 12/2001 | Boden et al. | |
| 6,701,437 B1 | 3/2004 | Hoke et al. | |
| 6,970,941 B1 * | 11/2005 | Caronni et al. ............. 709/238 |
| 7,072,346 B2 | 7/2006 | Hama | |
| 2002/0154635 A1 * | 10/2002 | Liu ............................. 370/392 |
| 2003/0233454 A1 * | 12/2003 | Alkhatib et al. ............. 709/226 |
| 2004/0006708 A1 | 1/2004 | Mukherjee et al. | |

OTHER PUBLICATIONS

Hardjono et al., The Multicast Security Architecture, Internet-draft, May 2003, 19 pages.
Mark Baugher et al., Group Key Management Architecture, Internet-draft, Jun. 27, 2003, 34 pages.
E.Rosen et al., BGP/MPLS VPNs, The Internet Society, Mar. 1999, 24 pages.

* cited by examiner

*Primary Examiner*—Longbit Chai
(74) *Attorney, Agent, or Firm*—Anderson Gorecki & Manaras LLP

(57) ABSTRACT

Method and apparatus that enable secure transmission of data in a scalable private network are described. Each station that is to be part of a private network registers with a key table. A group security association associated with the private network is forwarded to each trusted ingress and egress point that communicates with each member of the private network. When a member of the private network seeks to communicate with another member, it simply forwards the communication to the trusted ingress point. The trusted ingress point uses the security association associated with the private network to transform the communication and forwards the transformed communication through other intermediate stations in the network until it reaches a trusted egress point. The trusted egress point uses the stored security association to decode the transformed communication and forwards the communication to the appropriate destination. The ingress and egress points may be any points in the network, including customer edge devices, provider edge devices, or some combination thereof.

6 Claims, 13 Drawing Sheets

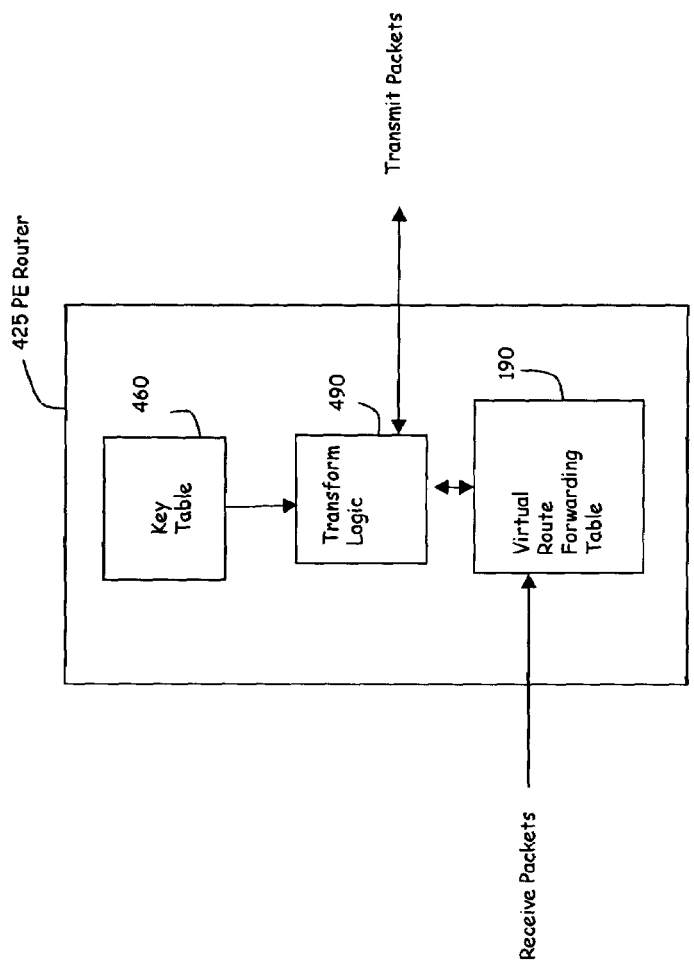
Figure 14
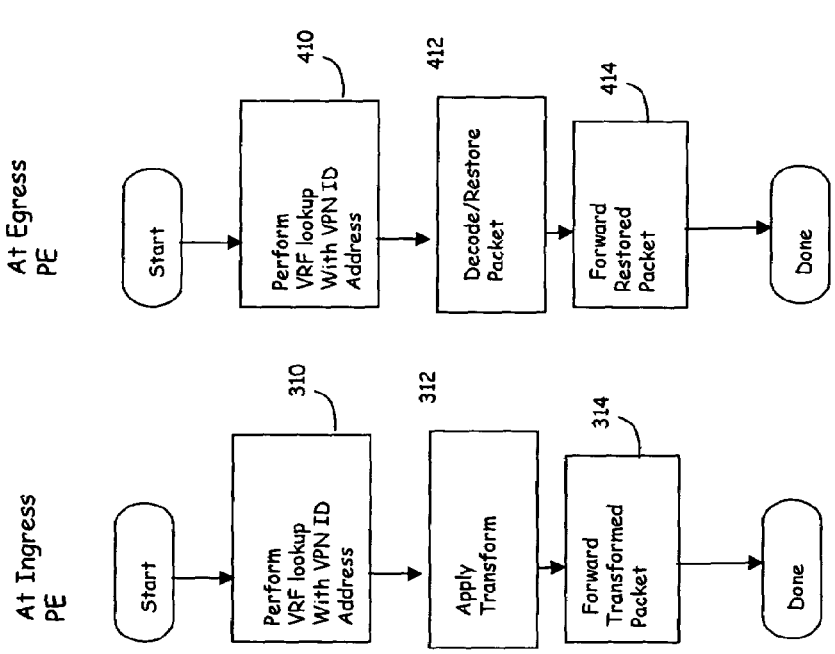
Figure 13A
Figure 13A

SCALABLE, DISTRIBUTED METHOD AND APPARATUS FOR TRANSFORMING PACKETS TO ENABLE SECURE COMMUNICATION BETWEEN TWO STATIONS

CROSS REFERENCE TO RELATED APPLICATIONS

The present application claims priority to provisional application No. 60/442,657 filed Jan. 24, 2003.

The following applications may be related to the present application:

SCALABLE, DISTRIBUTED METHOD AND APPARATUS FOR TRANSFORMING PACKETS TO ENABLE SECURE COMMUNICATION BETWEEN TWO STATIONS, Ser. No. 10/661,959, filed on even date herewith by Dondeti at al.

METHOD AND APPARATUS FOR PROVIDING A SCALABLE AND SECURE NETWORK WITHOUT POINT TO POINT ASSOCIATION, Ser. No. 10/661,959, filed on even date herewith by Fedyk et al.;

FIELD OF THE INVENTION

This invention is related generally to the field of networking and more specifically to a method and apparatus for providing secure communications in a networked environment.

BACKGROUND OF THE INVENTION

Typical corporations are comprised of many physically disjoint branches. Corporate networks seek to provide a seamless coupling between the branches so that a corporate user has access to the same data regardless of where the user connects in the physical network. Because the data travels between two physically disjoint sites, measures must be taken to ensure that the privacy of the data is maintained. Several solutions exist for establishing private connection between remote sites. The first solution is to provide dedicated connections between sites. However, dedicated connections require complex provisioning at each site, and thus may be very expensive. A second solution is to use a Virtual Private Network (VPN). In a VPN, network providers' resources (a 'backbone') are shared by many different customers. Each customer layers security mechanisms on top of the backbone to carve out their own portion of the network, thereby providing the appearance of a private network. Each member of the VPN stores forwarding and authentication information that enables communication with members of the VPN. The tables storing the forwarding information can get quite large as the network grows and point to point connection associated with each network device is recorded, and thus network scalability is an issue in VPN network design.

An additional problem with VPNs is that the data passed between sites is typically not encrypted. Thus, the opportunity is present for eavesdropping or data modification by other devices in the public network. To overcome the security concerns, IPsec (Internet Protocol Security Protocol) tunnels are generally used to maintain privacy in a VPN. IPsec provides per-packet authenticity/confidentiality guarantees between communicating sites. In general, a tunnel is created by allocating a key to each of a pair of communicating sites. Data transferred between the sites is encrypted and decrypted using the key. Because only the pair of sites has knowledge of the key, only those two devices can gain access to the data. To maintain a network that implements VPNs and IPsec tunneling, generally a table is maintained at each site, identifying the other sites participating in the VPN, and the keys that may be used to authenticate communication with these devices.

Thus, both VPNs and IPsec tunneling involve point to point connections between sites, and therefore require that data enabling the point to point connections be maintained at each site. As a result, for each of N connections in the network the amount of data stored to support such a network grows at a rate of $N^2-1$. In a network having a thousand endpoints, data may be stored identifying paths and authentication for the million connections between the endpoints, and the scalability of such a design rapidly becomes an issue.

To overcome the scalability issues associated with VPNs, Network based IP VPNs that allow the client sites to form routing peers with the service providers network prevent the client sites from suffering the effects of point to point connections. There are several variants of Network based IP based VPNs introduced in the standards bodies which share common attributes that address the scalability of point to point connections. One such architecture has been provided that uses layer 3 technology to abstract the particulars of the routing from the physical network topology. This architecture is described in the Internet Engineering Task Force (IETF) Request For Comments (RFC) 2547, as "Border Gateway Protocol (BGP)/Multi-protocol Label Switch Protocol (MPLS) VPNs", by Rosen et al, March 1999. RFC 2547 describes a method where service providers may offer virtual private network (VPN) services using Multi-Protocol Label Switching (MPLS) for packet forwarding and Border Gateway Protocol (BGP) for route distribution. BGP/MPLS VPNs, because they operate at layer 3 of the network, will be referred to hereinafter as IP VPNs.

In the IP VPN architecture, a set of "sites" is attached to a common network which is referred to as a "backbone". A site is a set of IP systems or devices which are capable of communicating with each other without the use of the backbone. For example, a site may include a set of systems which are in geographic proximity. In some protocols, such as the Border Gateway Protocol, a site would also be referred to as an autonomous system (AS). One or more Customer Edge (CE) devices are included at each site to enable the site to communicate with the backbone. The Customer Edge device may also be referred to as a gateway device, as it provides the communication path between the attached site (or autonomous system) and the service provider site.

A backbone is a network owned and operated by one or more Service Providers (SPs). The owners of the sites are customers of the SPs. The SP's backbone includes one or more Provider Edge (PE) routers, in addition to other routers that may not attach to CE devices. According to the IP VPN architecture, two sites have IP connectivity over the backbone only if there is some VPN which includes them both. Each PE router maintains a separate forwarding table for each VPN. When a packet is received from a particular site, the forwarding table associated with the VPN that the site belongs to is consulted to determine how to route the packet. It is important to note that the PE router does not include forwarding information for any VPN that has no site connected through the PE.

Referring now to FIG. 1, an exemplary IP VPN network is illustrated. At each site, there is one or more Customer Edge (CE) device, each of which is attached via some sort of data link 13 (PPP, ATM, Ethernet, Frame Relay, etc.), to one or more Provider Edge (PE) routers. The IP VPN network 10 illustrated in FIG. 1, includes CE device 12 at site 1, CE device 14 at site 2, CE device 16 at site 3 and CE device 18 at site 4. The backbone 19 includes PE devices 15 and 17, which may be operated by one or more different service providers.

Each PE maintains a number of separate forwarding tables, such as Virtual Routing and Forwarding (VRF) table 22 and 23 in PE 15. Every site to which the PE is attached is mapped to one of the forwarding tables. When a packet is received from a particular site, the forwarding table associated with that site is consulted in order to determine how to route the packet. For example, forwarding table 22 associated with site 1 is populated only with routes that lead to other sites that have at least one VPN in common with site 1.

The advantage of the IP VPN structure of FIG. 1 is its scalability from the client device. Because routing adjacencies are maintained at the between the PEs and from the PEs to the CEs rather than just between the CEs (as with layer 3 VPNs) the impact of any change in the network topology can be easily addressed by updating the VRF of the impacted PEs, thereby drastically reducing the amount of routing traffic in the network associated with maintaining route databases at each site. The problem with the IP VPN structure is that it does nothing to remedy the scalability issues associated with providing-security in the VPN. For example, it does not provide any data protection, i.e., confidentiality, message integrity, host authentication, replay protection etc. Rather, the IP VPNs rely on the fact that the PEs store forwarding information on a VPN specific basis, thereby ensuring that site information does not get forwarded to an incorrect destination.

The problem with such a scenario is that it requires that a high level of trust be placed on the Service Provider to protect the Customer data. Customers may be uncomfortable with the idea that their data may reside, unprotected, on the same data switch as that of a competitor, even if it is theoretically unavailable to the competitor. However, overlaying the traditional encrypted tunneling methods on top of the IP VPN structure simply introduces more point to point security associations, thereby eliminating the scalability benefits of the IP VPN architecture. Accordingly, it would be desirable to identify a method of further securing data in an IP VPN environment while maintaining the scalability attribute of the network.

SUMMARY OF THE INVENTION

According to one embodiment, Group Security Associations (GSAs) are used to protect data flows within an IP VPN. The GSAs are used to download keys to intended members of a Virtual Private Network. Each packet that is to be transferred within the VPN is transformed by first applying an IP tunnel to the packet, then selectively modifying an address field of the IP tunnel in accordance with a protocol of the backbone. The packet is then forwarded to the provider. The provider may then perform routing according to its protocol using the modified address. After routing information is determined, the provider updates the address field in accordance with the VPN protocol, and forwards the packet to the appropriate VPN member With such an arrangement, secure communication can be achieved without the need for point to point tunneling.

According to one aspect of the invention, a system for providing secure packet transmission between members of a scalable private network over a backbone includes a first node coupled to a backbone, and a provider node in the backbone. The first node is a member of the private network, and includes a table for storing a group security association associated with the private network and a tunneling mechanism for encapsulating packets that are to be transferred to the backbone in a public address to provide a secured packet. The first node also includes transform logic operable to apply a security association to each packet transmitted to the backbone, the transform logic including means for updating a field of the secure packet in accordance with a protocol of the backbone. The provider node operates according to a routing protocol, and includes a routing table, operable to determine a next hop routing address for each packet received at the provider node, the routing table operating responsive to a field of the packet arranged according to the protocol of the backbone. The provider node also includes means for updating a field of the packet prior to the routing of the packet if it is determined that the packet is forwarded between members of the scalable private network. With such an arrangement, packets may be securely transferred between members of a private network without altering typical packet handling at a receiving node.

According to another aspect of the invention, a method of securing packet data transferred between a first and second member of a private network over a backbone is provided, where the backbone operates according to a routing protocol. The method includes the steps of encapsulating a private address of a packet in a public address of the packet to generate a tunneled packet and transforming the tunneled packet by first applying a group security association associated with the private network to the tunneled packet to provide a secure tunneled packet and then updating a field in the secure tunneled packet in accordance with the routing protocol of the backbone.

According to a further aspect of the invention, a method of securing packet data transferred between a first and second member of a private network over a backbone operating according to a routing protocol is provided. The method includes the steps of determining routing information associated with a packet received at the backbone according to the routing protocol of the background, determining whether the packet is a member of the private network; and modifying at least one field of the packet according to a routing protocol of the private network responsive to a determination that the packet is a member of the private network.

These and other aspects of the invention will become apparent in view of the description below, which will be described in reference to the attached figures.

BRIEF DESCRIPTION OF THE DRAWINGS

FIGS. 13A and 13B are flow diagrams which illustrate steps performed at a provider edge device to transform and restore packet data to permit secure communication in a scalable private network of FIG. 12; and FIG. 14 is a block diagram illustrating exemplary functional blocks that may be included in a provider edge device to perform the transform and restore functions of FIGS. 13A and 13B.

DETAILED DESCRIPTION

Figure 2:
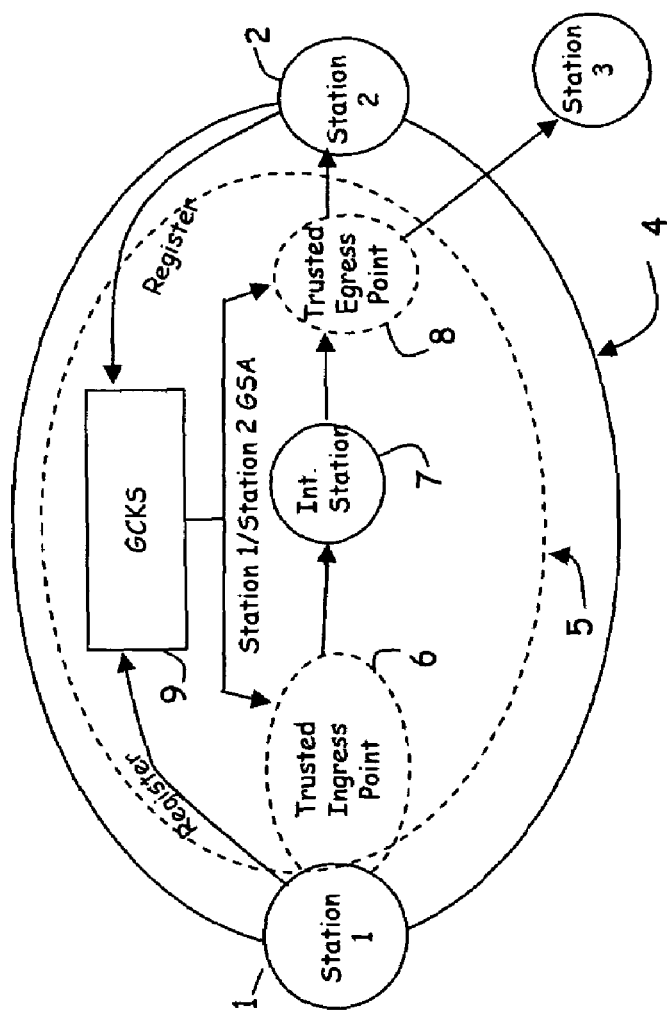
FIG. 2 is a block diagram for illustrating a scalable and secure architecture of the private network of the invention.

A method and apparatus for securing communication between two end stations: in a network will now be described. Referring now to FIG. 2, a high level network diagram is provided for illustrating several distinguishing characteristics of the present invention. In particular, in prior art designs communications were secured between two stations, such as station 1 and station 2, by forwarding a security association associated with the connection to each of the two stations. Thus, station 1 would store a security association enabling it to communicate with station 2 and another security association enabling it to communicate with station 3. When station 1 needed to communicate with station 2, it would secure its data using the security association associated with 2 prior to forwarding the data to station 2. In FIG. 2, the network boundary 4 illustrates that the security transform of the data occurred at each station, (i.e., via tunneling, encryption, or the like) and the data within boundary 4 was secured using the security association associated with the station 1/station 2 connection.

While this method provides secure communication it is difficult to scale because a security association needs to be stored for each communication link for each station. Also routing associations that determine which packets need to be sent over which security associations also have to be maintained further complicating scalability. To overcome the scalability issues while providing a secure network, the present invention incorporates the concepts of group key management protocol with a modification of security boundary positioning to provide a network that is both readily scalable and secure. For example, in FIG. 2 a trusted ingress point and a trusted egress point are identified. The trusted ingress point is any station, coupled to or including a source station, which is coupled to the network, and wherein communication between the source station and the trusted ingress station is protected. For example, the trusted ingress station could be a gateway station, which attaches the source station (which is part of a local area network) to the internet, and it is assumed that the gateway station provides firewall protection to any communication behind the gateway. Similarly, the trusted egress station is any station that is coupled to a destination station, and wherein communication between the trusted egress station and destination station is protected.

In the present invention, each station that is to be part of a private network registers with a key table, such as Global Control Key Server 30, which will be described in more detail below. A group security association associated with the private network is forwarded to each trusted ingress and egress point that communicates with each member of the private network. For the purposes of this specification, a 'private network' is any secured communication medium that is provided between two or more network devices, regardless of the underlying infrastructure of the communication link. For example, a 'private' network connection may be provided, using the concepts of this invention, between two network devices that communicate on a public infrastructure (such as the Internet), or between a 'private' corporate LAN and a public infrastructure, or any combination thereof.

When a member of the private network seeks to communicate with another member, it simply forwards the communication to the trusted ingress point 6 with a Virtual Private Network (VPN) group address associated with the other member. The trusted ingress point uses the security association associated with the private network to transform the communication and forwards the transformed communication through other intermediate stations in the network (such as station 7), until it reaches the trusted egress point 8. The trusted egress point uses the stored security association corresponding to the Virtual Private Network (VPN) group address to decode the transformed communication and forwards the communication to the appropriate destination.

With such an arrangement, the amount of data that needs to be stored at each of the trusted ingress and egress points is limited to the number of private groups in the VPN, rather than the number of possible connection paths. For example, assuming that station 3 is part of the private network including stations 1 and 2. When a communication is received at the trusted egress point 8, whether the destination is station 2 or station 3, a common security association can be used to recover the transformed communication, as opposed to prior art techniques which would require separate tunnels between stations 1 and 2 and stations 1 and 3. From a transmission standpoint, this eases the data storage requirements at a transmitting station, since for each transmission to a destination it need store only the private network identifier associated with the destination node to ensure secure communications. Also similarly no extra routing information is required on a per destination basis. From a destination standpoint, because a secured packet is restored to its original form prior to delivery to the destination, no additional data needs to be stored at the node. The resulting network is therefore scalable and secure.

Figure 1:
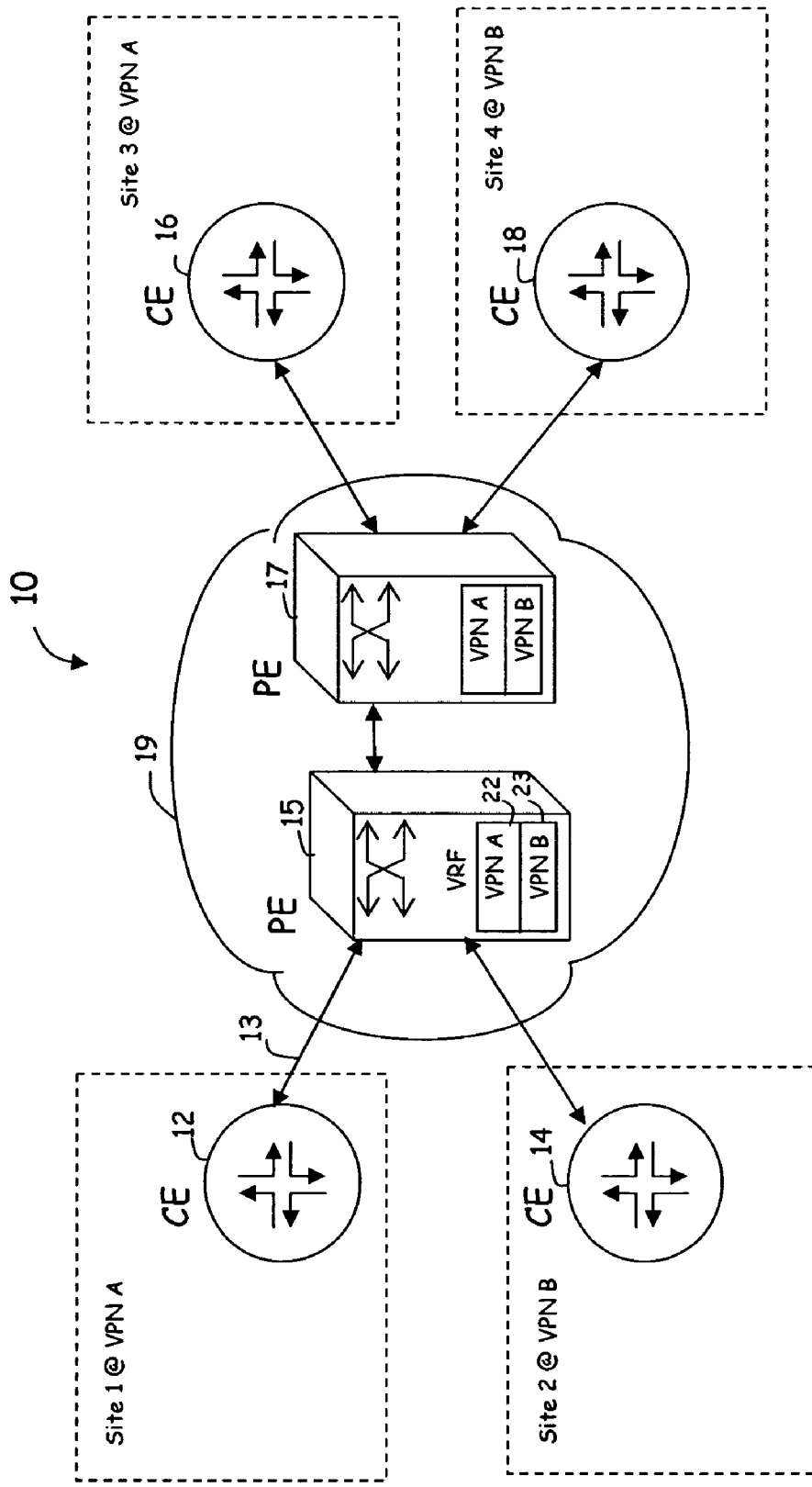
FIG. 1 is a block diagram of a Virtual Private Network architecture.

The present invention modifies the existing concepts of where the security boundaries need to be established in order to facilitate network scalability. In FIG. 2, the dashed boundary 5 illustrates that the security transforms may take place anywhere within boundary 5. As will be described in more detail below, the various trusted ingress points at which transforms are applied may include the Customer Edge (CE) device, Provider Edge (PE) device, or some combination thereof. In addition, the trusted egress points at which the transforms are decoded could include the CE device or the PE device. In addition, it should be noted that various transform mechanisms will also be described, but the present invention is not limited to any particular type of transform described herein. Also, although the various embodiments described below use as a basis the terminology and network characteristics of the BGP/MPLS IP VPN network described previously in FIG. 1, it should be understood that the present invention is not limited to the specifics of the 2547 BGP/MPLS implementation. Rather, the below embodiments could easily be adapted by one of skill in the art for use in any other IP based VPN transport network architectures, such as described in RFC 2764 "A Framework for IP Based Virtual Private Networks" by Gleeson, or Frame Relay over VPN, etc. Accordingly, the present invention is not limited to any particular IP VPN architecture.

1. Customer Edge Transform Embodiment

Figure 3:
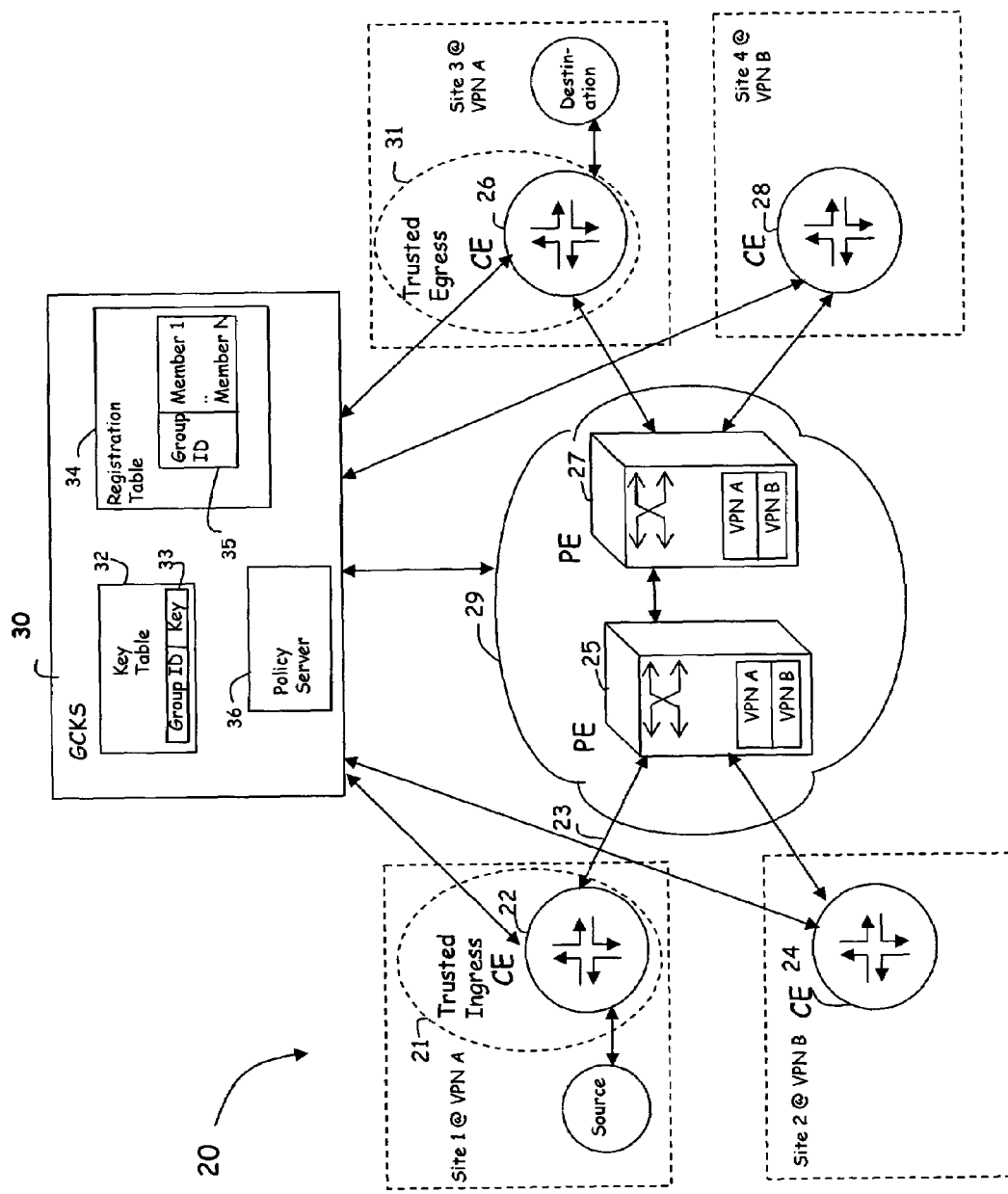
FIG. 3 is a block diagram of a scalable Private Network architecture including components of the invention that secure communication of the links in the scalable private network through the use of transforms at CE ingress and CE egress points.

Referring now to FIG. 3, an IP VPN network 20 is shown to include a number of Customer Edge (CE) devices 22, 24, 26 and 28, coupled to one or more Provider Edge (PE) routers 25 and 27. In the IP VPN network, routing information for each CE is maintained in Virtual Routing and Forwarding Tables 22 and 23. Each PE includes routing information for only the CEs which are members of VPNs that traverse the PE. By limiting the routing information to those VPNs that traverse the PE, it can be assured that the CE devices that are not members of the respective VPN cannot gain access to the network.

Group key management protocols help to ensure that only members of a secure group can gain access to and authenticate group data. The main goal of group key management protocol is to securely provide the group members with an up to date Security Association (SA) containing the information need to secure group communication. Generally speaking, a Security Association (SA) is a set of policy and cryptographic keys that provide security services to network traffic that matches that policy. A SA typically includes selectors, properties, cryptographic policy, and keys. The selectors include source and destination transport addresses. The properties include, for example, a security parameter index or cookie pair, and identities. Cryptographic policy includes the algorithms, modes, key lifetimes, and key lengths used for authentication or confidentiality. The keys include the authentication, encryption and signing keys. It should be noted that the present invention may utilize any type of SA, and thus should not be limited to only the SAs used below to describe the exemplary embodiments.

Group Security Associations (GSAs) are a bundling of SAs that together define how a group communicates securely. The GSA may include, for example, a registration SA, a rekey protocol SA, and one more data security protocol SAs. A GSA includes all of the attributes identified above with regard to SAs, but also include several additional attributes. For example, GSAs have group policy attributes, such as the kind of signed credential needed for group membership, if group members will be given new keys when a member is added, or whether group members will be given new keys when a member is removed from the group. A GSA is comprised of multiple SAs, and these SAs may be used for independent purposes. For example, three types of SAs which are generally needed for group communication are Registrations SAs, allowing a group member to register with the GCKS, Re-Key SAs, allowing the GCKS to forward new keys to all group members, and Data Security SAs, which protect data between sending and receiving members of the group.

One element of group key management which is used in the present invention is the Group Controller and Key Server (GCKS) 30. GCKS 30 is shown in FIG. 3 coupled to each of the CE devices, and is used to transfer a key to each CE that is a member of each VPN, wherein a unique key is provided for each VPN. Although the GCKS 30 is shown as one functional block, it is used to represent both the entity and functionality relating to the issuance and management of cryptographic keys used by a multicast group, which is subject to the user authentication and authorization checks conducted on the candidate member of the multicast group. Although only one GCKS is shown in FIG. 3, it should be understood that there may be one or more GCKSs in a network, and thus the key management functionality may be distributed.

The GCKS 30 is shown in FIG. 3 as an entity that is separate from a CE or PE device. However, the present invention is not limited to such a structure, and as will become clear with the discussion of various embodiments disclosed below, the GCKS functionality may be included in a PE, a CE, or in a distinct entity (as shown in FIG. 3). The GCKS 30 is shown to include various representative components, including a key table 32, a registration table 34 and a policy server 35. It should be noted that although the components are shown as separate entities, the below described functionality of each may be merged or further divided, and the functionality may be implemented in software, hardware, or some combination thereof. The key table 32 includes a number of entries, such as entry 33, which stores a key for each group ID. The key is used by the group for encryption and decryption of packets that are transferred between group members, and thus provides at least one SA for the group. The registration table 34 is used to identify members of each group (or VPN in this example). As CEs enter and leave the VPN, the registration table is updated to reflect the current VPN members. In the event of a key change or the like, the registration table provides member identification data for transmitting the change to each member of the respective group. The policy server 35 represents both the entity and functions used to create and manage security policies. Although the policy server is shown included as part of the GCKS 30, it may be a separate, network administrative entity. It serves to install and manage the security policies related to the membership of a given multicast group and those relating to keying material for a multicast group.

The GCKS is largely a standard defined entity, and more details on the operations and management of Group keys can be found in both "The Multicast Security Architecture", Internet Engineering Task Force (IETF) Draft, draft-iety-msec-arch-01.txt, by Hardjono et al of May 2003, and "Group Key Management Architecture", IETF MSEC WG, Internet Draft draft-ietf-msec-gkmarch-05.txt, by Baugher et al, both incorporated herein by reference. Both of the above documents describe implementation alternatives which may differ from those described herein, but are equally applicable to the present invention.

According to one embodiment of the invention, the Group Security Associations (GSAs) maintained in conjunction with the GCKS may be used in a novel manner to secure data in an IP VPN network. In this embodiment, the trusted ingress point 21 to the network is an ingress CE, and the trusted egress point 31 is an egress CE. The data that is to be forwarded over the network is transformed at the ingress CE 21 prior to its transmission to the PE. In general, the transform that is applied to the packet to be transmitted is one which secures the data payload of the packet, but retains sufficient addressing fields in the header portion to enable the PE to process the packet appropriately given the operating protocol of the PE. The solution described in the below figures is merely one embodiment of a transform that may be used when using the BGP/MPLS protocol. Other embodiments that serve the same purpose (preserving the address portion) may alternatively be used, and also other embodiments that are intended for other protocols are also covered in the present invention.

Figure 4:
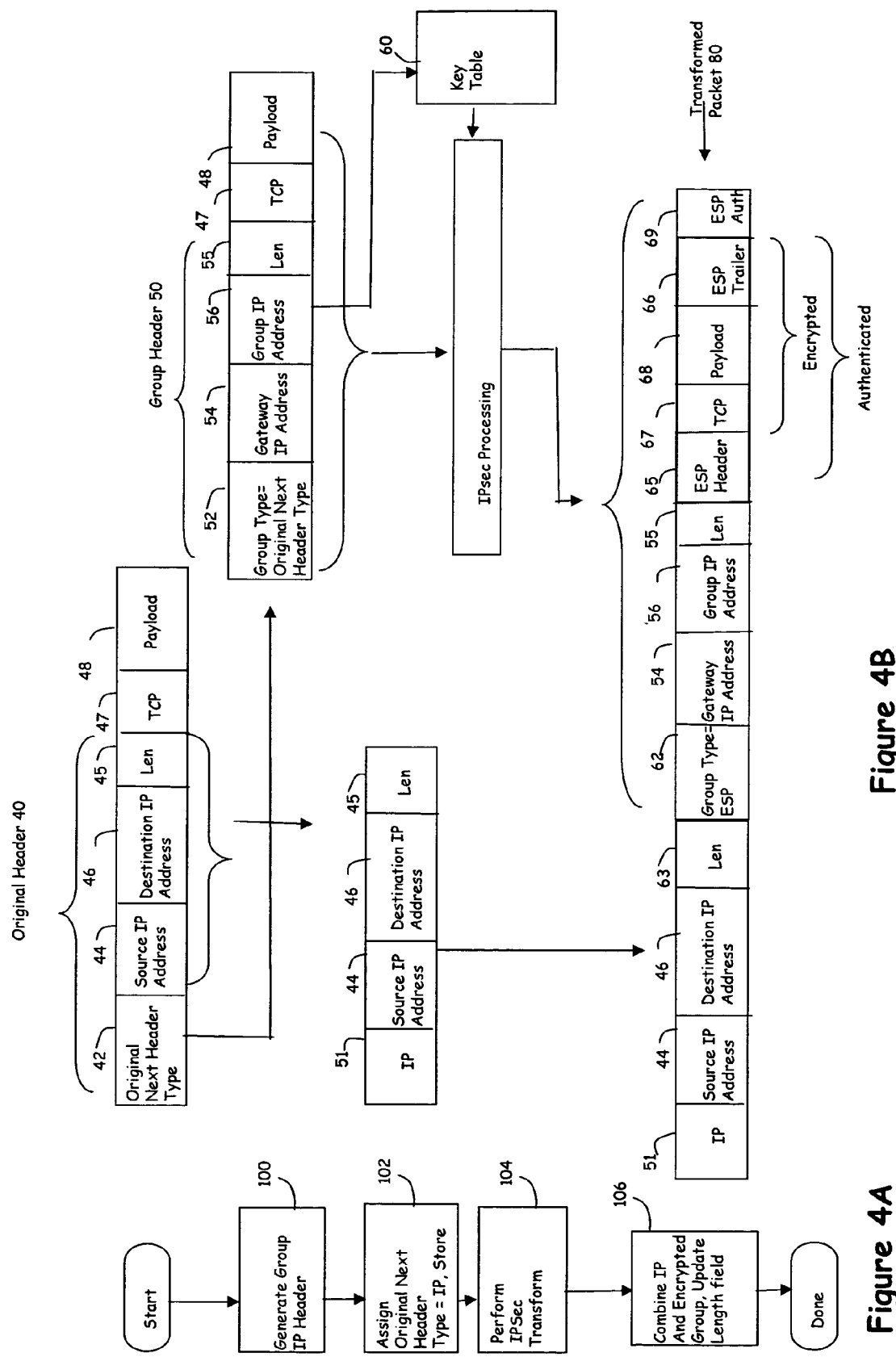
FIGS. 4A and 4B are a flow diagram and data flow diagram, respectively, which illustrate a method of transforming a packet by a customer edge device to permit secure communication in a scalable VPN.

The particular solution provided herein involves transforming the traditional IP header format used in the IP VPN architecture. The method of transforming the IP header will now be described with regard to the flow diagram of FIG. 4A. A data flow diagram 4B is also provided to more clearly illustrate the packet transform process of the present invention.

The general layout of an Internet packet (whether it be and Internet Protocol (IP) or Transmission Control Protocol (TCP) packet) is shown in FIG. 4B as including an Original IP header 40 and a payload 48. The general structure of an IP header includes a number of fields including a next header field 42, identifying a format, protocol type or address family of the header, a source IP address 44, identifying the source of the packet, a destination IP address 46, identifying a destination of the packet, and a length field 45 identifying the total number of bytes included in the packet. For the purposes of this application, the term Original Header will be used to identify a header of a packet before transformation. As will be seen below, as different protocols are layered on top of one another, it may be that there are multiple headers appended to a particular payload, and the next header field may be used to identify the respective types of headers in the packet.

At step 100, the first stage of packet transformation, a Group Header 50 is populated. The Group Header includes the basic IP header fields of Next Header Type, Source IP address, Destination IP address and Length. The Next Header Type field 52 is obtained by copying the value of the Next Header Type field 42 from the Original Packet 40 into the group next header field 52. Similarly, the length value 45 is copied to the group IP length value 55. The source IP address 54 of the group header is overwritten with the Gateway IP address, i.e., the public address of the CE that issued the packet (i.e., the IPsec gateway address), and the Destination IP address 56 for the group header becomes the Group IP address, where the Group IP address is the VPN group address (i.e., the group private network identifier).

Once the Group Header 50 is populated, at step 102 the Next Header type field 42 of the original header being modified to be a fixed value, such as 'IP' in the example of FIG. 4B and the original header 40 is stored for later use. At step 104, the newly populated Group Header 40, along with the TCP and Payload fields 47 and 48, respectively, are processed according to IPsec processing techniques. In the example of FIG. 4B, security transform is applied to the Group Header, TCP and Payload fields of the modified packet. In the example of FIG. 4B, an Encapsulating Security Protocol (ESP) transform of the IPsec protocol suite is used, although it should be recognized that other alternative security transforms, such as those of the IPsec Authentication Header (AH) protocol or similar secure data transform mechanisms may be substituted for the ESP in the discussion below without altering the spirit and scope of the invention.

The Encapsulating Security Payload (ESP) can be used to provide confidentiality, data origin authentication, connectionless integrity, an anti-replay service (a form of partial sequence integrity), and (limited) traffic flow confidentiality. The set of services provided depends on options selected at the time of Security Association (SA) establishment and on the location of the implementation in a network topology header is designed to provide a mix of security services in IPv4 and IPv6. ESP may be applied alone, in combination with the IP Authentication Header (AH) or in a nested fashion. Security services can be provided between a pair of communicating hosts, between a pair of communicating security gateways, or between a security gateway and a host. The ESP header is typically inserted after the IP header and before the next layer protocol header in transport mode. However, it should be noted that the transformation of the present invention differs from the standard IPsec transport and tunnel mode implementations. As is described in more detail below, the transform combines the two, by using the ESP transport mode encapsulation methods in conjunction with the provision of a tunnel using both the private (IP) and public (gateway) addresses of the source node. In fact, the present invention may employ any security transform; IPsec protocols such as ESP and AH are merely examples.

In the embodiment of FIG. 4B, IPsec processing receives an input from a key table 60, resident on the CE. The key table 60 includes, for each VPN, a key for encrypting and/or decrypting transmissions associated with the VPN, with the keys being previously stored in them Key table by referencing the GCKS as described above. The IPsec processing selects one of the keys in the key table in response to the Group IP address from the Group Header, and uses it to encrypt the TCP and Payload fields of the packet. An ESP Header 65 is inserted into the frame. The ESP header 65 includes a Security Parameters Index (SPI) field and a Sequence Number (not explicitly shown). Following these fields is the TCP and Payload Data 67 and 68 respectively, which has a substructure that depends on the choice of encryption algorithm and mode. Depending upon the security association, these fields may be encrypted using the key from the key table 60. Following the Payload Data is the ESP trailer 66. The ESP trailer 66 generally includes Padding and Pad Length fields, and the Next Header field. The optional ESP Authentication field 69 includes an Integrity Check Value (ICV) field completes the packet. Thus, with the use of IPsec processing, a portion of the packet that is to be transferred from the CE to the PE is now secure. As shown in FIG. 4B, the ESP Header field 65, TCP and Payloads 67 and 68, and ESP Trailer are Authenticated fields. In general, they are authenticated by executing an integrity check algorithm over these fields, with the result being stored in the ESP Authentication field 69, effectively providing a checksum of the data for later authentication. The TCP and Payload fields as well as the ESP Trailer fields are encrypted according to a preferred encryption algorithm.

At step 106, the Original IP header, as modified at step 102, is appended to the beginning of the IPsec processed packet, and the value of the Length field 63 is incremented to include a byte count of the new Group Header. The result is transformed packet 80.

Figure 5:
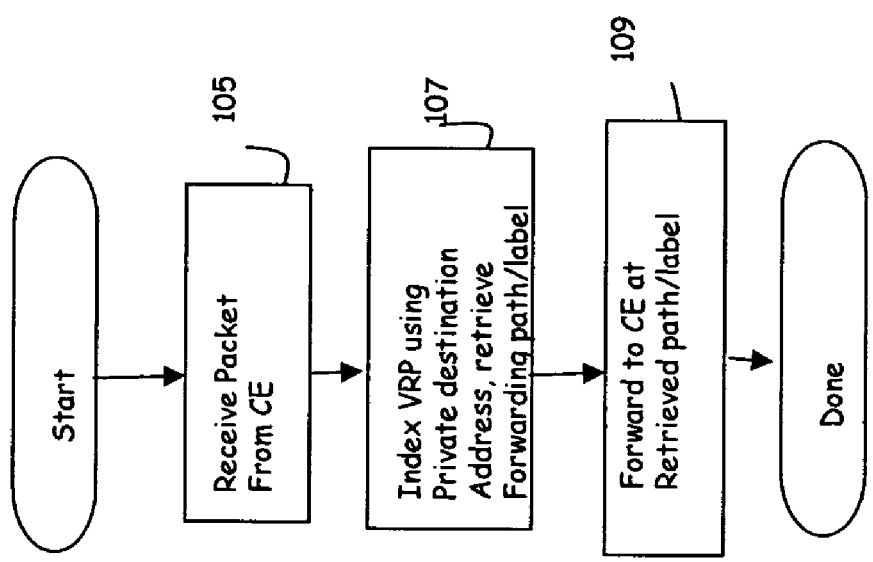
FIG. 5 is a flow diagram illustrating exemplary steps that may be performed at a service provider that receives the transformed packet of FIGS. 4A and 4B in a scalable VPN.

The transformed packet 80 provides a mechanism for IP VPNs to be used while maintaining data confidentiality, because the payload is not accessible to any PE, or to any CE that is not part of the GSA. Encrypting data that is forwarded on a shared backbone increases the security of customer data, since it provides further confidentiality of data that is already isolated on a customer basis by the IP VPN network. Referring briefly to FIG. 5, an exemplary flow diagram illustrating the handling of the transformed packet by a PE device is shown. At step 105, the PE receives the packet for the CE. At step 107, the PE uses the value in the Destination IP address field 46 to index the Virtual Routing table. The Virtual Routing Table provides routing data to index the destination CE.

For example, in a system that uses the MPLS protocol, the label of the CE would be provided, although the present invention is not limited to any particulars type of routing protocol. At step 109, the transformed packet 80 is then transferred to the appropriate CE.

Figure 6:
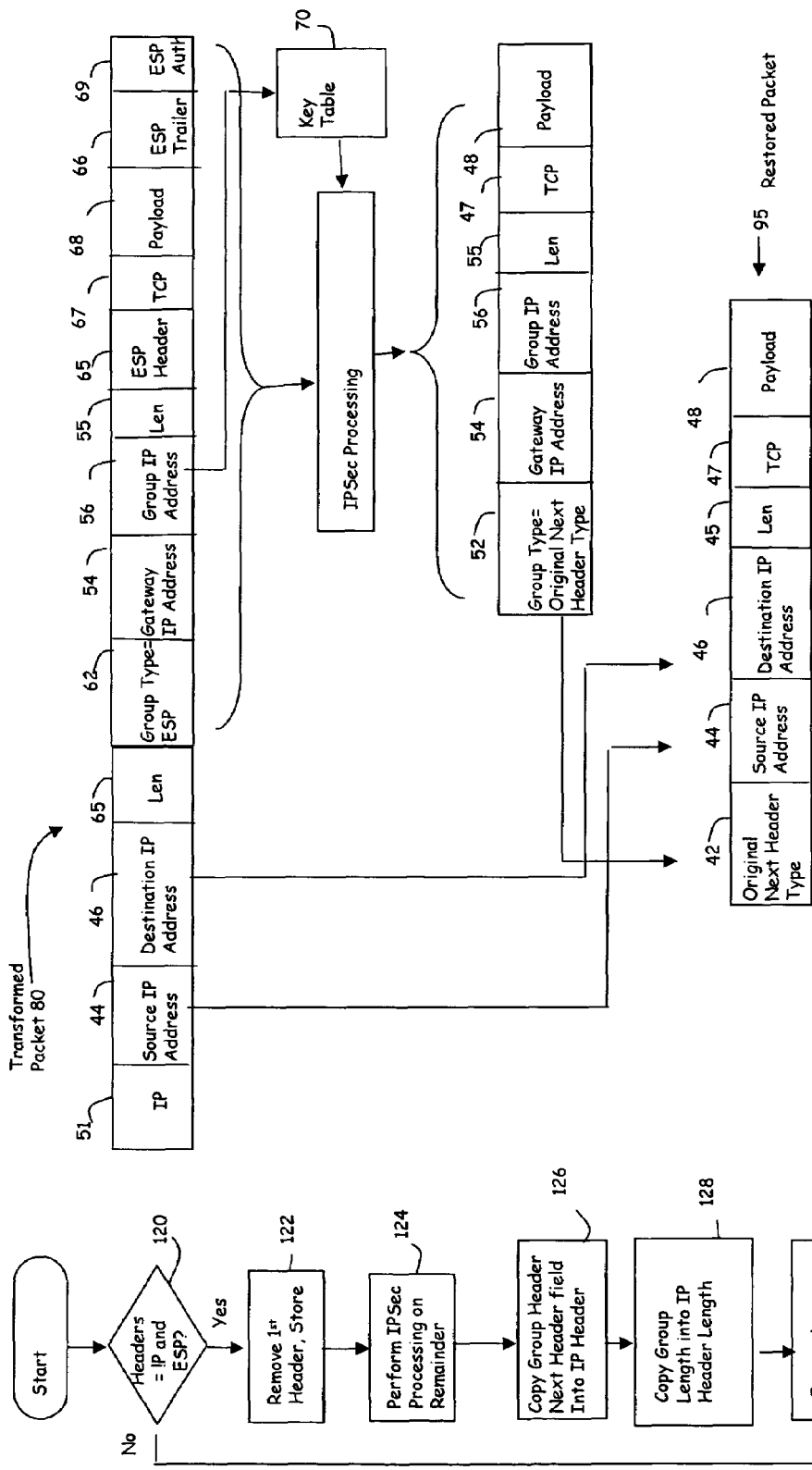
FIGS. 6A and 6B are a flow diagram and data flow diagram, respectively, which illustrate a method of restoring a packet transformed according to the process of FIGS. 4A and 4B by a customer edge device to permit secure communication in a scalable VPN.

Referring now to FIGS. 6A and 6B, a discussion of how the transformed packet is processed as it is received at a CE device will now be described. Typical prior art packet processing receives an input packet at a gateway, and determines whether the destination address is the gateway address. If it is not the gateway address, the packet is destined for a node coupled to the gateway. Therefore, a forwarding table is immediately accessed and the packet is sent on its way.

However, because the present invention has transformed the overall structure of the packet prior to its transmission, it needs to be restored to its original structure before any determination can be made as to how to handle the received packet. The restoration is performed as shown in FIGS. 6A and 6B. At step 120, it is first determined whether the packet is a type that has been transformed and that the transform is based on a group Key that this decrypting node understands. It is possible to have group key packets that do not belong to this entity pass through a node unaltered, and in addition it is possible that packets that are transferred through the node are not packets that are secured via a group security association. Thus, only a subset of packets in the network will be transformed, and only a portion of those will belong to a receiving node. If it has not been transformed, then the process returns to step 130, and the packet is forwarded as usual. One method of determining whether or not the packet has been transformed is to compare the first two Next Header Type fields. If the first Next Header type field is equal to the pre-assigned value (the present example uses the type IP), and the second Next Header field is equal to ESP type, then the packet is a transformed packet and should be restored. Other methods of determining that the packet is in a transformed state, including setting a flag bit in the packet, defining a new Next Header Type field, testing the decryption key or the like may alternatively be used, and the present invention is not limited to the specific method described herein.

If it is determined that the packet is a transformed packet that should be decrypted, then at step 122, the first header (which includes the private address fields 51, 44, 46 and 65) is stripped from the packet and stored. The remainder of the packet is forwarded to IPsec processing logic. As part of the IPsec processing, a lookup is performed, using the destination address (from the original IP header) and the Security Parameters Index (SPI) to confirm whether the IPsec module can process the packet. Alternatively, if a separate SA is maintained for each sender, the lookup would be performed using the Source Address of the original IP packet, in addition to SPI and Dest address. As shown in FIG. 6B, a key table, resident at the receiving gateway, is accessed using the Group IP address to retrieve the key associated with the VPN. The IPsec processing logic performs authentication and decryption processes on the payload using the retrieved key.

When the packet has finished IPsec processing, the payload, length, and original Next Header Type values have been restored to their original values. The private IP header is retrieved from storage, and the values from the Next Header Type field 52 and Length field 55 are used to overwrite the Next Header field 42 and Length field 45 of the private IP header. The TCP values and Payload are then appended to the modified private IP header, to provide the restored packet 95. The restored packet 95 may then be forwarded to the forwarding table for forwarding further within the local enterprise.

Figure 7:
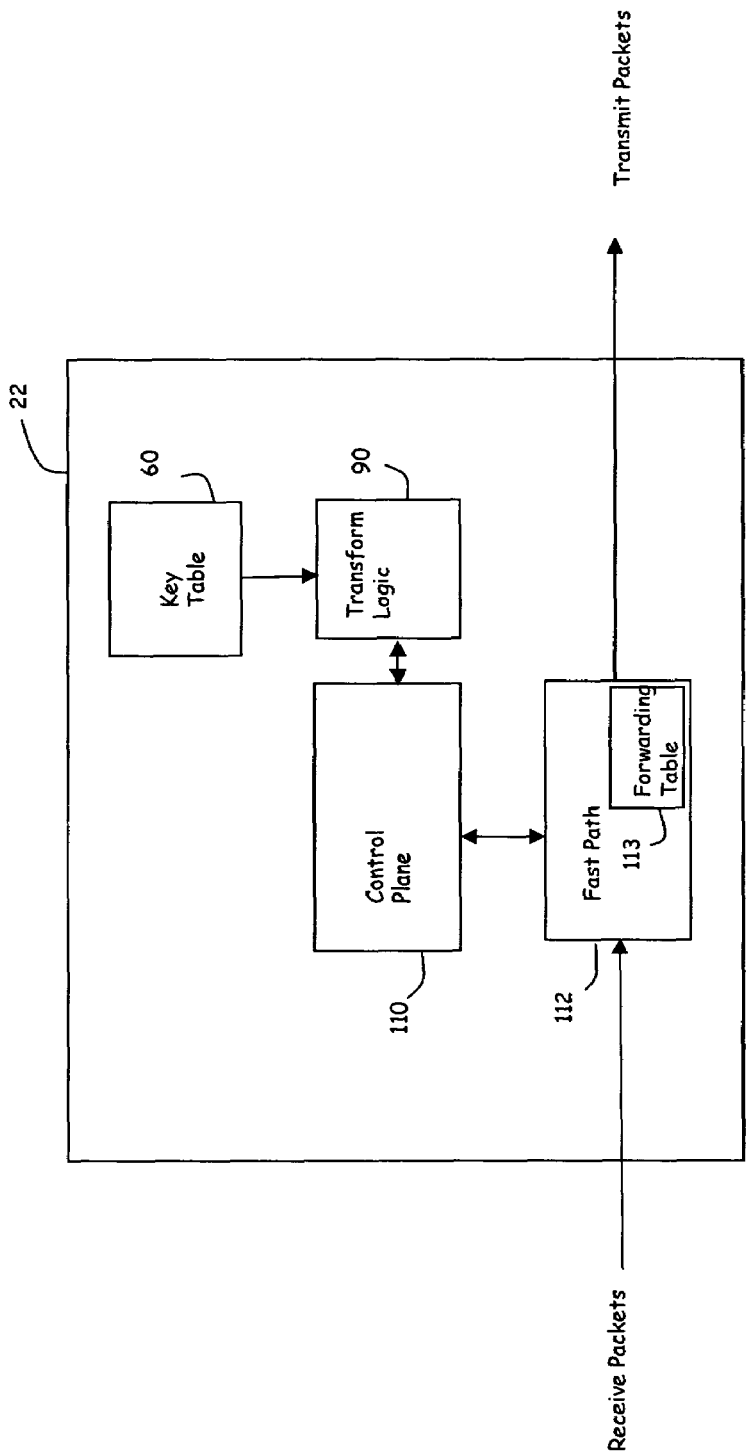
FIG. 7 is a block diagram illustrating exemplary functional blocks that may be included in a customer edge device to perform the transform and restore functions of FIGS. 4A and 6A.

Referring briefly to FIG. 7, a block diagram is provided illustrating exemplary components that may be included in a CE device that uses the concepts of this embodiment of the present invention. The architecture of the CE is shown to be generally apportioned into a fast path 112 and a control plane 110. The fast path 112 is used for fast forwarding of data through the device, while the control plane 110 performs more complex packet processing roles. A CE device of the present invention may include transform logic 90, coupled to the control plane, as well as the key table 60. Other components may additionally be included, and other arrangements for implementing the functionality described above with regard to FIGS. 5A, 5B, 6A and 6B may also be used. In addition, although the various components are shown as functional blocks, it is understood that their functionality may be implemented in hardware, software or some combination thereof.

Accordingly one embodiment of a method and apparatus has been presented for securing transmission in an IP VPN network without the need for providing point to point connections. The method and apparatus incorporates the concepts of Group Security Associations (GSAs) in a novel manner to distribute keys to members of the WPN group, and identifies trusted ingress and egress points within the network at which security transforms are performed. In this embodiment, the trusted ingress and egress points are CE devices, and an address transform combines IPsec tunneling and transport security mechanisms with the GSAs to enable the encryption of payload data that is distributed over the backbone. The transform retains the portion of the address needed by the PE for routing the packet over the backbone, while ensuring that the remaining data within the packet is protected. With such an arrangement, a scalable architecture capable of supporting encrypted virtual private networks is provided.

The above embodiment has described a mechanism for transforming an address, whereby the address transformation occurs at the CE and is invisible to the PE. Such a solution is advantageous to the CE, because it does not involve having to 'trust' the provider or pay for additional services. However, there may be certain CEs that may not have the capabilities or desire to perform the above described solution, yet still want to have their data encrypted. In addition, as described above, the transformation of the address adds additional steps at the receiving end, and alters the typical packet processing paradigm, increasing the amount of time that is spent in analyzing incoming packets. The added delay may not be desirable to some customers. Accordingly, other embodiments of the invention, illustrating various other forms of address transforms that may be implemented at different locations will now be described.

2. Shared CE/PE Transform Embodiment

Figure 8:
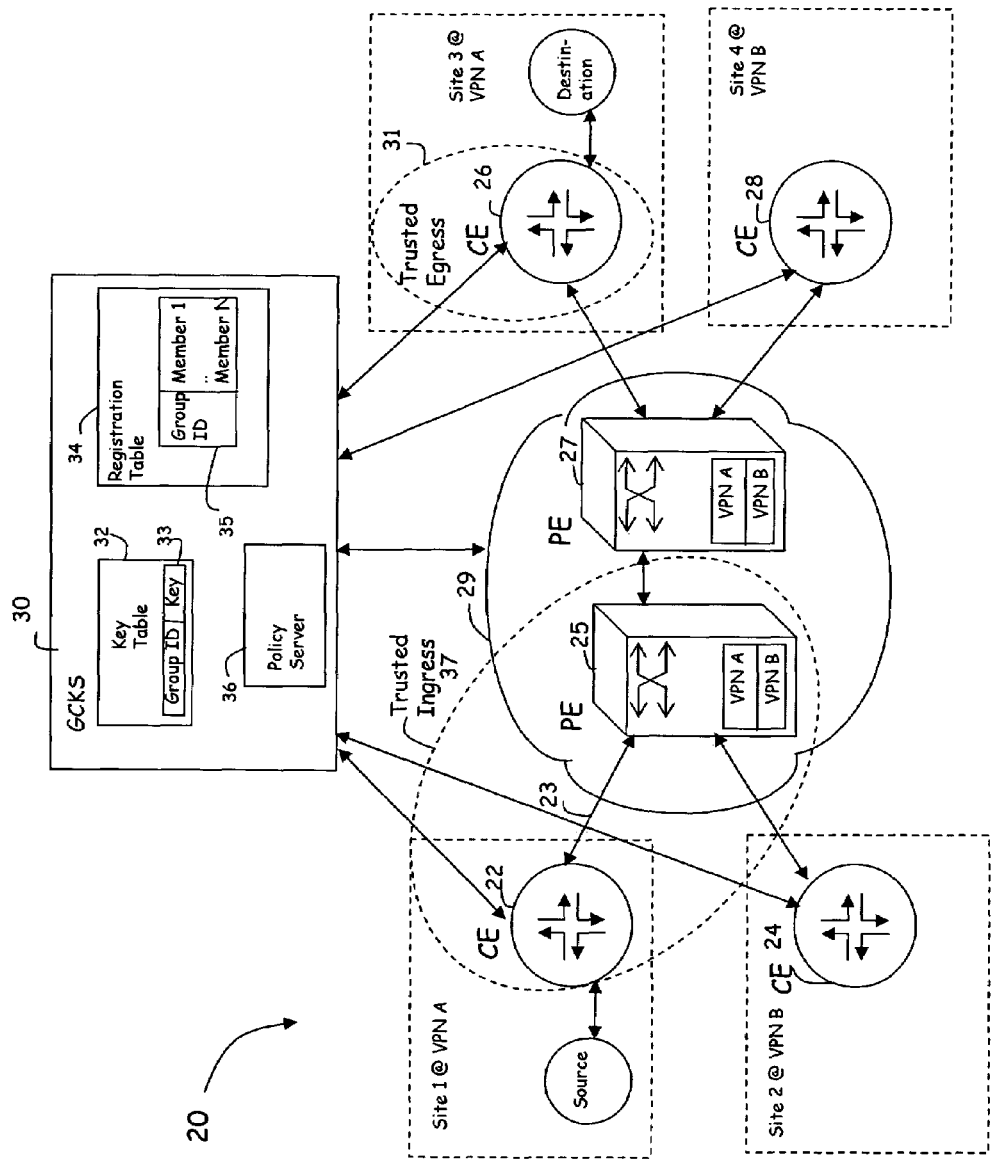
FIG. 8 is a block diagram of a scalable Private Network architecture including components of the invention that secure communication of the links in the scalable private network through the use of shared transforms at CE and PE ingress points and CE egress points.
Figure 9:
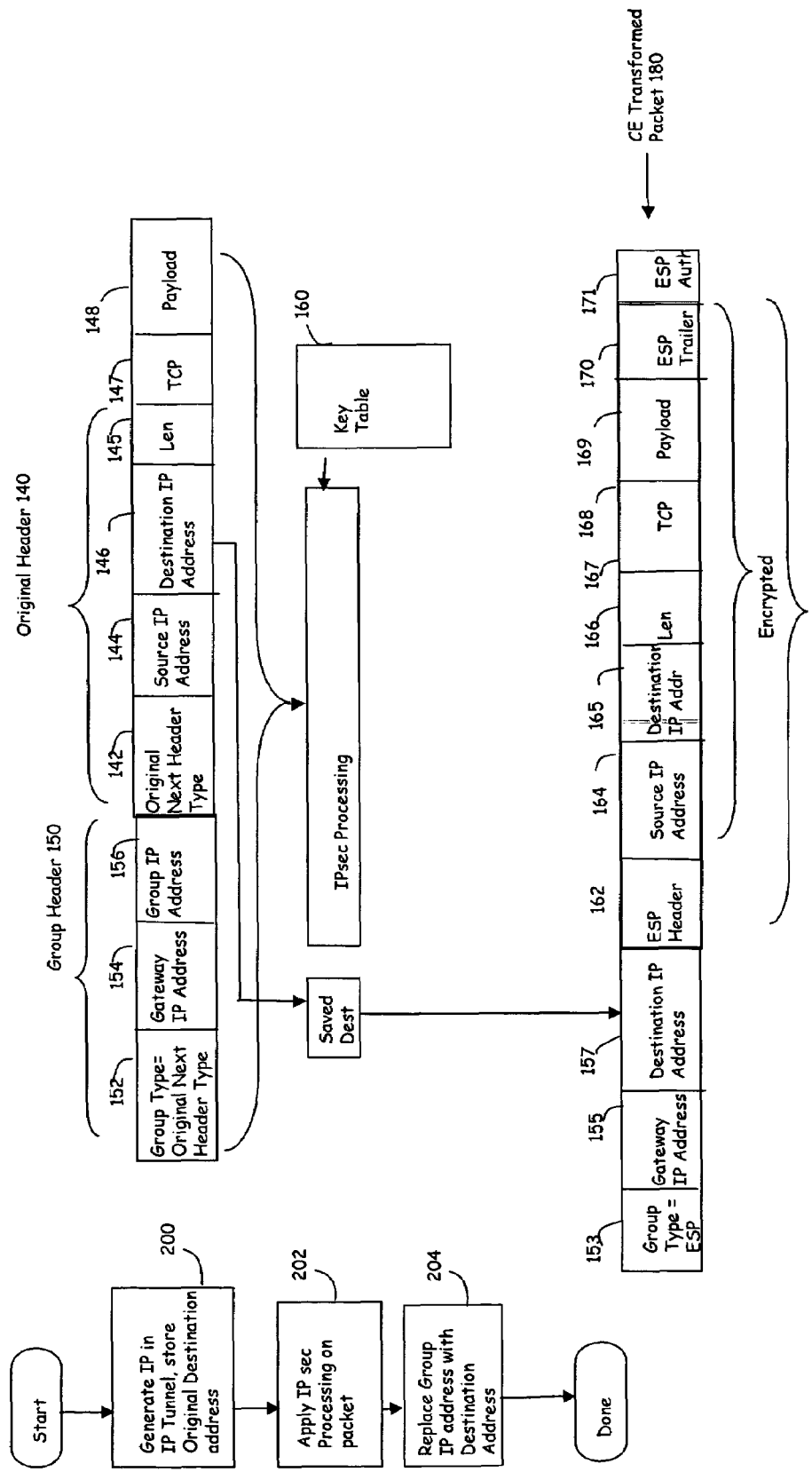
FIGS. 9A and 9B are a flow diagram and data flow diagram, respectively, which illustrate steps performed at a customer edge device to perform a shared transform of packet data to permit secure communication in a scalable private network of FIG. 8.
Figure 10:
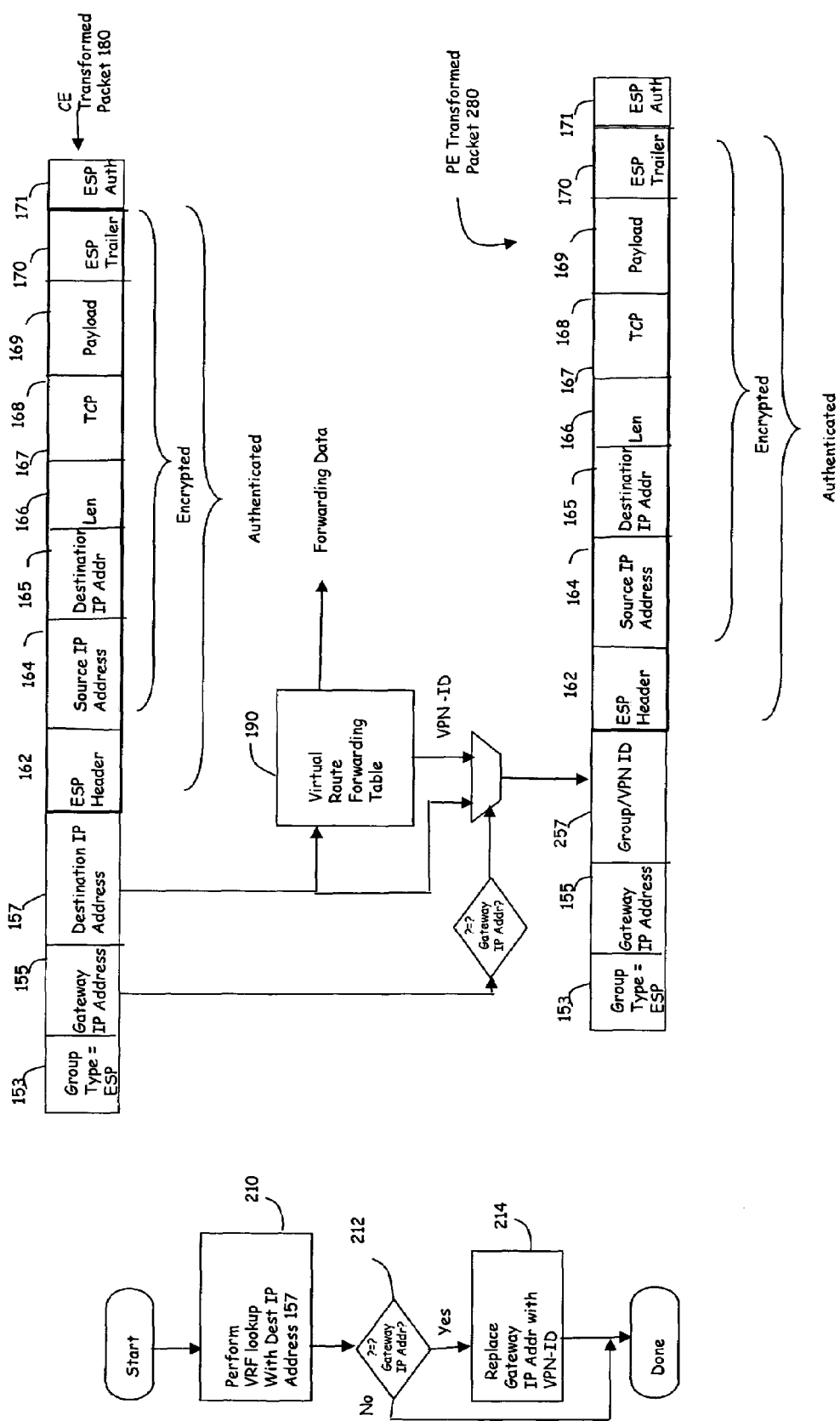
FIGS. 10A and 10B are a flow diagram and data flow diagram, respectively, which illustrate steps performed at a provider edge device to perform a shared transform of packet data to permit secure communication in a scalable private of FIG. 8.

Referring now to FIGS. 8-11, another embodiment of the present invention will now be described. As shown in FIG. 8, the trusted ingress point 37 is distributed between a Customer Edge device and Provider Edge device boundary, and the trusted egress point 31 is the CE device. In this embodiment, portions of an address transform are performed by each of the CE and PE devices to provide secure communications among different sites in an IP VPN network. Such an embodiment may be desirable in a networked environment where a the owner of the PE wishes to gain some revenue for providing some services. For the purposes of clarity, the below embodiment will be referred to as a 'shared transform' method and apparatus. FIG. 9A provides a flow diagram illustrating exemplary steps performed at a CE during the shared transform method, while FIG. 9B illustrates the arrangement of fields in a resultant packet header of the transform.

Assume that the CE receives an IP packet for transfer over the IP VPN network. At step 200, the CE (which is also referred to as the IPsec gateway) encapsulates the IP header data with the Group IP header defined in the IP VPN protocol. That is, as shown in FIG. 9A, a group header, with a source equal to the IP Gateway address, the Destination equal to the VPN ID, and Next Header Type field indicating an IP VPN type header is pre-pended to the IP header 140. The value in the Destination Field 146 of the original IP header is saved.

At step 202, normal IPsec processing is performed on the outer IP header (i.e., the gateway IP, Group IP address) to provide the CE transformed packet 180. Note that in this implementation, the entire original packet (including header 140 and payload) may be encrypted and authenticated. The previously saved value from the Destination field 146 is used to overwrite the Group IP address. The CE transformed packet is then transferred to the PE.

Referring now to FIG. 10A, at step 210, when the PE receives the packet 180, it performs the VRF lookup using the value in the Destination Field 157 to find the routing data necessary to forward the packet (for example, an MPLS label). At step 212, the value in the Source field is evaluated to determine whether it is the IPsec Gateway Address. If it is the IPsec Gateway address, it signals the PE that the CE had previously transformed the packet data. As a result, if it is the gateway address, the PE replaces the value in the Destination Address field with the VPN-ID, which is available from the VRF. The packet can then be transferred directly to the CE. Standard packet processing techniques are performed in the CE in this embodiment. It can be seen that this embodiment is somewhat similar to the CE transform embodiment, in that the portion of packet data needed for routing by the PE is maintained in the header, while the remaining packet data is protected.

Figure 11:
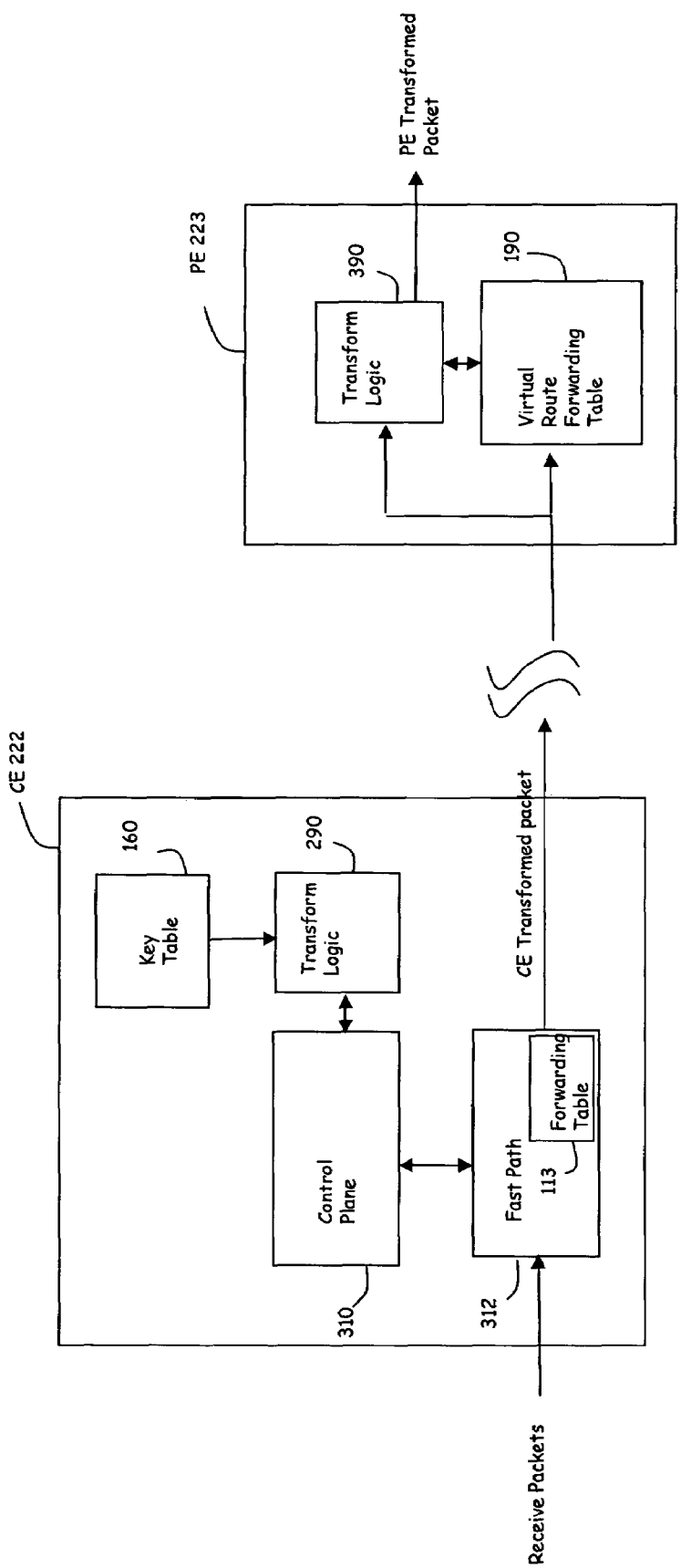
FIG. 11 is a block diagram illustrating exemplary functional blocks that may be included in customer edge and provider edge devices to perform the transform and restore functions of FIGS. 9A and 10A.

Referring briefly to FIG. 11, a few exemplary functional blocks that may be included in the CE and PE to implement according to this embodiment of the present invention are shown. The CE, as in the previous embodiment, includes, in addition to its fast path 312 and control path 310, a key table 160 and transform logic 290, which operates as described in FIGS. 9A and 9B. Exemplary components that are included in the PE to implement the present invention includes the Virtual Route Forwarding Table 190 and transform logic 390, which operates using the processes described in FIGS. 10A and 10B.

Accordingly, two embodiments of a method for securing transactions in a VPN network by transforming the addresses provided to the provider network have been shown. In the first embodiment, discussed with reference to FIGS. 4-7, CE devices were the selected trusted ingress and egress points for the network. Such an embodiment could be used in situations where the CE sought to protect all data forwarded to a PE device. In the second embodiment, discussed with reference to FIGS. 8-11, the trusted ingress point was shared between the CE and PE devices, with the CE being the trusted egress point. Such an arrangement served the advantage of providing potential revenue for the ISP, and providing a method of address transformation that does not require any modification of CE hardware. However, such embodiments may not be desirable for simple CE devices that desire security but cannot afford to maintain the databases. Two alternative embodiments will now be described.

3. Provider Edge Transform Embodiment

Figure 12:
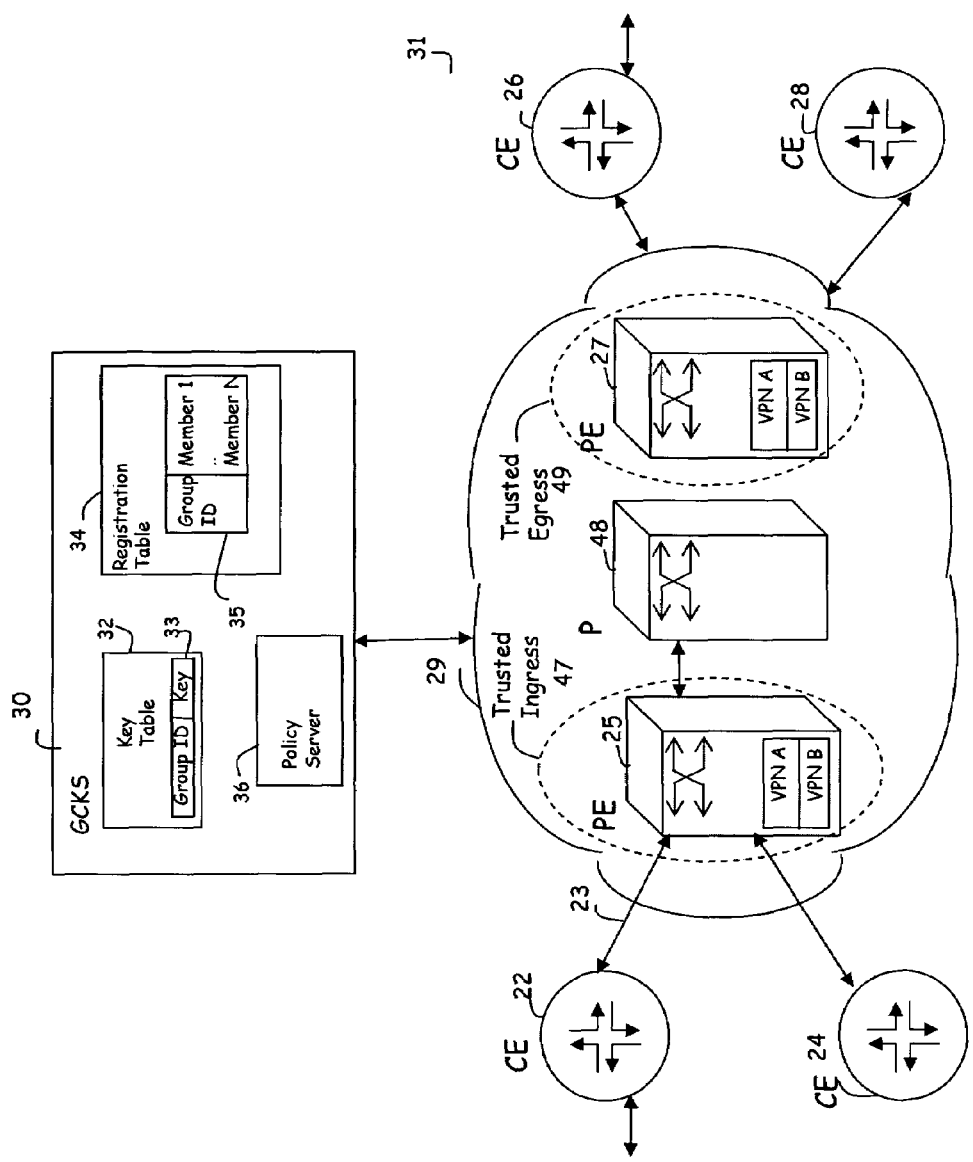
FIG. 12 is a block diagram of a scalable Private Network architecture including components of the invention that secure communication of the links in the scalable private network through the use of transforms at PE ingress and PE egress points.

Referring now to FIG. 12, a block diagram of a third embodiment of the IP VPN network of the present invention is shown, wherein the trusted ingress point 47 is a Provider Edge device, and the trusted egress point 49 is also a Provider Edge device. Disposed between provider edge devices 25 and 27 are one or more other provider devices, such as P 48. This embodiment of the invention seeks to provide a network alternative to protecting data that may be implemented by trusted ISPs, to protect the data from other service providers as it travels across the internet.

Referring now to FIGS. 13A and 13B a pair of flow diagrams is provided for illustrating the operation of a PE according to this invention. Prior to the forwarding of packets through the PE, each CE registers with the GCKS. VPN IDs for each of the CEs within VPNs are propagated to the respective VRFs of the PEs. In this embodiment, each PE stores, with the VPN-IDs, a security association, (for example, a key) associated with the VPN. At step 310, when the ingress PE receives a packet from one of the CEs in a VPN, it retrieves the security association data for the VPN-ID, and at step 312 transforms the packet, using either of the methods described previously in FIG. 4 or 9. At step 314 it then forwards the packets to the next PE in the network.

In FIG. 13B, when the packet reaches the Egress PE, the Egress PE first verifies that the packet is destined for the attached CE (by examining the destination address), then, at step 410 the Egress PE retrieves the security association data associated with the PE. At step 412, the PE uses the security association to restore the packet, and at step 414 forwards it to the appropriate CE device.

With such an arrangement, a method is made available for Provider devices to provide a secure, scalable communication service to its customers by providing a mechanism to encrypt data as it propagates over the backbone. As in the previous embodiments, the payload data is secured, with only the portions of the header needed for transport on the backbone retaining their unprotected values. While this embodiment has shown the PE as the egress device, it is appreciated that the result would be largely the same if the trusted egress device was a Customer Edge device.

Referring briefly to FIG. 14, exemplary components that would be included in PE devices of this nature include a Key table 460, the Virtual Route Forwarding table 190 and transform logic 490, which could implement either the transforms illustrated in the previous embodiments or some other type of transform which secured the data payload while retaining route header information.

Accordingly, various methods and apparatus have been described which enable secure transmission of data in a scalable and secure network. The invention uses group security association protocols and selection of trusted ingress and egress boundaries to provide both scalability and security. In one embodiment, the secure ingress and egress boundaries are customer edge devices, and a packet transform is performed by at the customer edge ingress device. The transform retains addressing portions of the packet necessary to enable the IP VPN communication framework, while securing the remainder of the data packet. As the transformed packet is received at a trusted egress point, the transformed packet is restored to its original form prior to packet processing. In an alternative embodiment, the trusted ingress point is shared between a CE and PE device; a shared transform is performed by the customer edge and provider edge, with the customer securing the packet payload and modifying the gateway address to provide a destination address enabling fast routing by the provider. The provider uses the modified address to retrieve forwarding data, and restores the modified address to its original form for further forwarding on the network. Standard packet forwarding techniques may then be used at the trusted egress device. In a third embodiment, PE devices may be used as both trusted ingress and trusted egress devices, thereby offloading any modifications to customer devices.

Various modifications to the above embodiments are envisioned, and therefore are not seen as limiting the present invention. In particular, although the present invention was described using terminology of the RFC 2547, BGP/MPLS protocol, any alternative IP VPN protocol may be used without affecting the spirit and scope of the invention. In addition, although various components were shown as functional blocks, it is understood that these functions may be implemented in hardware, software, or any combination thereof, and no particular delineation of functionality is part of the invention. In particular, although various address transforms have been described, the present invention is not limited to any particular type of transform, or the encryption or decryption of any particular fields. Rather, as stated above, any portion of the packet may be secured, provided that the data needed for routing over the backbone is made obtainable by the PE.

Alternative embodiments of the invention may be implemented in any computer readable program language, whether it be conventional or object oriented, or alternatively using discrete components, integrated circuitry, programmable logic, microprocessors or any combination thereof. A computer program product implementation may include a series of computer instructions fixed either on a tangible medium, such as a computer readable media (e.g. diskette, CD-ROM, ROM or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g. microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in a memory device, such as semiconductor, magnetic, optical or other memory devices, and may be transmitted using any communications technology, such as optical, infrared, microwave, or other transmissions technologies.

Having described various embodiments of the invention, it is understood that the present invention should not be limited to any specific disclosure herein, but rather is embodied in the spirit and scope of the claims attached hereto.

The invention claimed is:

1. A method of securing packet data transferred between a first and second member of a private network coupled to client edge devices over a backbone comprising a plurality of provider devices including provider edge devices, the backbone operating according to a routing protocol, the method comprising the steps of:
    encapsulating a private address of a packet from the first member with a group header including a public address associated with the first member and a group address to generate a tunneled packet;
    transforming, at a client edge device, the tunneled packet by first applying a same group security association associated with the private network to the tunneled packet of a different non-group point-to-point connection to provide a secure tunneled packet and then adding a header field to the secure tunneled packet, the added header field including a gateway address associated with the first member of the private network and a destination address of the second member of the private network to provide a client transformed packet;
    forwarding the client transformed packet to a provider edge device; and
    replacing, at the provider edge device, a destination field of the packet with a group identifier associated with the private network for routing the packet across the backbone.

2. The method according to claim 1, wherein the group security association is associated with each member of the private network.

3. The method according to claim 1, further comprising the steps of:
    each member of the private network registering with a global security server;
    the global security server forwarding the group security association to each member of the private network.

4. The method according to claim 3 including the step of the global security server periodically forwarding a new group security association to each member of the private network.

5. A method of securing packet data transferred between a first and second member of a private network over a backbone, the first and second member of the private network being coupled to respective client edge devices and the backbone comprising a plurality of provider devices including provider edge devices, the backbone operating according to a routing protocol, the method comprising the steps of:
    determining, responsive to a gateway address of a packet, whether a packet received from a client edge device at a provider edge device of the backbone has been transformed to secure packet data transferred across the backbone, wherein transforming, at said client edge device, is by applying a same group security association associated with the private network to the received packet of a different non-group point-to-point connection;
    modifying at least one field of the packet to replace a destination address of the packet with a group identifier associated with the private network responsive to a determination that the gateway address of the packet indicates that the packet is a member of the private network.

6. A system for transforming packets for forwarding between a plurality of members coupled to client edge devices of a private network over a backbone comprised of a plurality of provider devices including provider edge devices in a scalable private network, wherein the backbone operates according to a protocol, the apparatus comprising:
    a key table, the key table including a security association for each private network that the node is a member;
    a client edge device including:
    a tunneling mechanism for encapsulating packets that are to be transferred to the backbone in a public address including a gateway address and a group address to provide a tunneled packet; and
    transform logic operable to apply a security association to the tunneled packet and to append a header to the tunneled packet, the header including a gateway address and a destination address to provide a transformed packet for transmission by the client edge device to the backbone, wherein transforming, at said client edge device is by applying a same group security association associated with the private network to the tunneled packet of a different non-group point-to-point connection;
    a provider edge device coupled to the client edge device, the provider edge device comprising a virtual route forwarding table for storing group identifiers associated with destination addresses and means, responsive to the gateway address of the header, for selectively updating the destination field of the packet with a group identifier for routing the packet across the backbone.

* * * * *